US012705130B2

(12) United States Patent
Lien et al.

(10) Patent No.: US 12,705,130 B2
(45) Date of Patent: Aug. 11, 2026

(54) PARTIALLY GOOD BLOCK HANDLING IN A MEMORY DEVICE

(71) Applicant: Micron Technology, Inc., Boise, ID (US)

(72) Inventors: Yu-Chung Lien, San Jose, CA (US); Jiangli Zhu, San Jose, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 111 days.

(21) Appl. No.: 18/618,639

(22) Filed: Mar. 27, 2024

(65) Prior Publication Data

US 2024/0330094 A1 Oct. 3, 2024

Related U.S. Application Data

(60) Provisional application No. 63/455,811, filed on Mar. 30, 2023.

(51) Int. Cl.
*G06F 11/07* (2006.01)

(52) U.S. Cl.
CPC ...... *G06F 11/0775* (2013.01); *G06F 11/0727* (2013.01)

(58) Field of Classification Search
None
See application file for complete search history.

(56) References Cited

U.S. PATENT DOCUMENTS

2011/0063918 A1 3/2011 Pei et al.
2013/0028021 A1 1/2013 Sharon et al.
2013/0166991 A1 6/2013 Shimada
2018/0277208 A1* 9/2018 Kamalanathan ..... H10N 70/828
2022/0066868 A1* 3/2022 Betz .................... G06F 11/1068
2024/0185924 A1 6/2024 Lien et al.
2024/0185931 A1 6/2024 Lien et al.
2024/0185934 A1 6/2024 Lien et al.
2024/0185935 A1 6/2024 Lien et al.
2024/0203502 A1 6/2024 Lien et al.
2024/0203503 A1 6/2024 Lien et al.
2024/0203504 A1 6/2024 Lien et al.
2024/0203513 A1 6/2024 Lien et al.

FOREIGN PATENT DOCUMENTS

WO 2008013431 1/2008

OTHER PUBLICATIONS

"International Application Serial No. PCT US2024 021733, International Search Report mailed Jul. 15, 2024", 3 pgs.
"International Application Serial No. PCT US2024 021733, Written Opinion mailed Jul. 15, 2024", 4 pgs.

* cited by examiner

*Primary Examiner* — Guerrier Merant
(74) *Attorney, Agent, or Firm* — Schwegman Lundberg & Woessner, P.A.

(57) ABSTRACT

A programming failure is detected at a block of a memory device. Based on detecting the programming failure, the block is determined to be partially good based on a number of failed bytes in the block. An unfailing portion of the block is identified in response to determining the block is partially good. A record indicating the block is partially good and identifying the unfailing portion of the block is stored.

20 Claims, 7 Drawing Sheets

PARTIALLY GOOD BLOCK HANDLING IN A MEMORY DEVICE

PRIORITY APPLICATION

This application claims the benefit of priority to U.S. Provisional Application Ser. No. 63/455,811, filed Mar. 30, 2023, which is incorporated herein by reference in its entirety.

TECHNICAL FIELD

Embodiments of the disclosure relate generally to memory sub-systems and more specifically to identifying and handling partially good blocks in a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
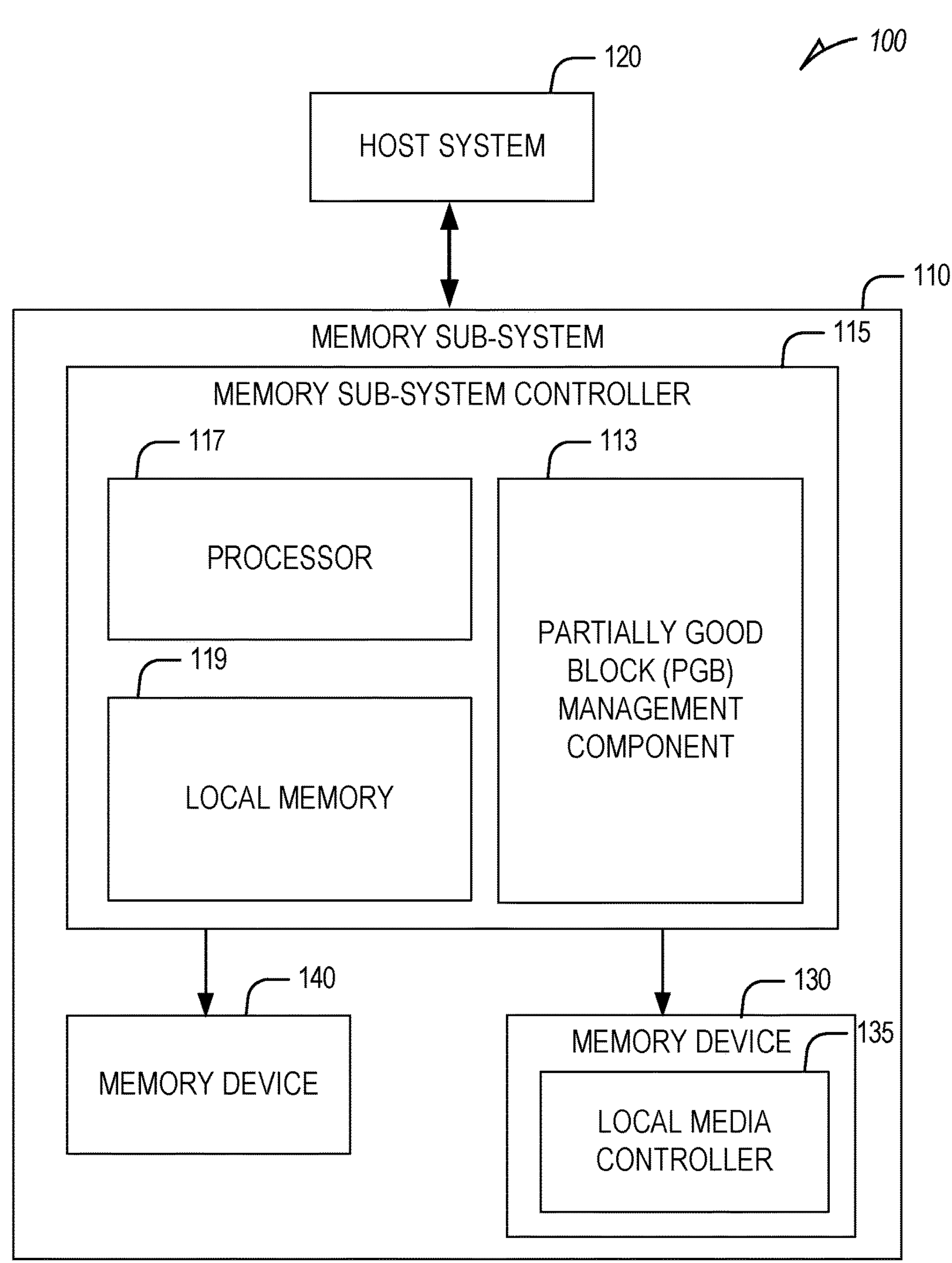
FIG. 1 is a block diagram illustrating an example computing system that includes a memory sub-system, in accordance with some embodiments of the present disclosure.

Aspects of the present disclosure are directed to an approach identifying and using a partially good block (PGB) of a memory device in a memory sub-system. A memory sub-system can be a storage device (e.g., solid-state drive (SSD)), a memory module, or a combination of a storage device and memory module. Examples of other storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device. Other examples of non-volatile memory devices are described below in conjunction with FIG. 1. A NAND memory device can include multiple NAND dies. Each die may include one or more planes and each plane includes multiple blocks. Each block includes an array that includes pages (rows) and strings (columns). A string includes a plurality of memory cells connected in series. A memory cell ("cell") is an electronic circuit that stores information. Depending on the cell type, a cell can store one or more bits of binary information and has various logic states that correlate to the number of bits being stored. The logic states can be represented by binary values, such as "0" and "1," or combinations of such values.

Various memory access operations can be performed on the memory cells. Data can be written to, read from, and erased from memory cells. Memory cells can be grouped into a write unit, such as a page. For some types of memory devices, a page is the smallest write unit. A page size represents a particular number of cells of a page. For some types of memory devices (e.g., NAND), memory cells can be grouped into an erase unit, such as a block. Data can be written to a block, page-by-page. Data can be erased at a block level. However, portions of a block cannot be erased.

One or more row decoders may be included in blocks of a memory device. A row decoder is used to select particular word lines in a page based on row addresses received as input. Signals (e.g., comprising program data) are transmitted from the row decoder to the selected word lines. For some architectures, a row decoder may be placed on either the right or left edge of a page and signals from the row decoder are transmitted across the page from the left to right or right to left.

Other architectures utilize central row decoders that are placed within a page (e.g., at the center of the page). With these architectures, signals from the row decoder are transmitted from within the page (e.g., the center) to the edge of the page. This architecture reduces word line loading by physically isolating a single page into two, which also helps to reduce timing for word line ramping and stabilization while also improving timing for read and program operations.

A bad block (also referred to herein as "invalid block") refers to a block that is no longer reliable for storing or retrieving data, for example, due to a defect (e.g., manufacturing defect) or due to wear, and may incorrectly store bit values. An incorrect bit value is hereinafter referred to as an invalid bit or a failed bit. Likewise, an incorrect byte value is hereinafter referred to as an invalid byte or a failed byte. A grown bad block (GBB) refers to a block being unreliable due to wear or defect. A grown bad block can be identified based on a threshold (e.g., bit error rates (BER) threshold). With conventional approaches to bad block management, bad blocks are detected and marked as such to prevent data from being written to the bad blocks.

In certain instances, when a failure of a block is detected, the failure only impacts a portion of the block (also referred to as a "failing portion") while another portion of the block (also referred to as an "unfailing portion") remains reliable for storing and retrieving data. A block having a failed portion and an unfailing portion is hereinafter referred to as a partially good block (PGB). In instances in which the failing and unfailing portions are half of the block, the block may be referred to as a half good block (HGB). As an example, as noted above, a central row decoder may physically isolate a single page into two, thereby dividing a block into two portions, or more specifically, two halves-a left half and a right half. A block failure may impact only a half of the block (the failing half) while the second half (the unfailing) remains capable of reliably storing data. Many conventional approaches to bad block management do not distinguish fully bad blocks from PGBs and thus the usable unfailing portions of PGBs are wasted. Other approaches to bad block management involve differentiating blocks as good or bad vertically and adjusting read levels for HGBs based on string current mismatches between full block and HGB usage. These approaches also utilize other countermeasures such as lowering the pass-through voltage during read operations or other program compensation techniques to realign pre-verify voltage (PVFY) and read levels.

Aspects of the present disclosure address deficiencies of prior approaches to bad block management with an improved approach to identifying and using PGBs. Contrary to prior approaches, this improved approach involves differentiating good (unfailing) and bad (failing) portions (e.g., halves) of blocks horizontally. In an example, a PGB management component of a memory sub-system determines whether a block is a partially good block in response to detecting a failure of a program operation directed at the block. The PGB management component determines a block in a memory device is a PGB based on whether a number of failed bytes in the block satisfies a first threshold condition (e.g., defining a threshold number of failed bytes). Based on determining the block is a PGB, the PGB management component identifies an unfailing (good) portion of the block based on a comparison of the number of failed bytes in each portion of the block. In examples in which a row decoder physically isolates the block into a left half and a right half, the PGB management component determines whether the left half or the right half is the good (unfailing) half based on comparison of the number of failed bytes in the left half with the number of failed bytes in the right half. In comparing the number of failed bytes in each portion of the block, the PGB management component may determine a difference between the number of failed bytes in two portions (e.g., a left half and a right half) and determine which portion is the good portion based on whether the difference satisfies a second threshold condition (e.g., a threshold difference). The PGB management component stores a record indicating that the block is a PGB and identifying the unfailing portion of the block. The PGB management component may store the record in a file system area (e.g., in a look-up table) of the memory sub-system that is associated with the memory device.

When a command to perform a data operation directed at the block is received, the memory sub-system accesses the record associated with the block, which, as noted above, indicates the block is a PGB and identifies the unfailing (good) portion of the block. Based on the record indicating that the block is a PGB, the PGB management component turns off transistor switches of the row decoder on the side of the failed portion of the block to disable the failed portion and the data operation is executed on the unfailing portion without interference from the failed portion.

This approach to PGB handling discussed above, and described in further detail below, enables the memory sub-system to avoid wasting usable memory resources that would otherwise be marked as bad and be prevented from storing data. In addition, this approach simplifies read-level handling for the memory sub-system. What's more, utilization of this approach by the memory sub-system reduces power consumption for program and read operations.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a host interface. Examples of a host interface include, but are not limited to, a SATA interface, a PCIe interface, USB interface, Fibre Channel, Serial Attached SCSI (SAS), Small Computer System Interface (SCSI), a double data rate (DDR) memory bus, a DIMM interface (e.g., DIMM socket interface that supports Double Data Rate (DDR)), Open NAND Flash Interface (ONFI), Double Data Rate (DDR), Low Power Double Data Rate (LPDDR), or any other interface. The host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include NAND type flash memory and write-in-place memory, such as a three-dimensional cross-point (3D cross-point) memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and 3D NAND.

Each of the memory devices 130 can include one or more arrays of memory cells. One type of memory cell, for example, single level cells (SLC), can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. For example, the memory device can include a set of blocks. Design specifications may define a constraint on a minimum number of valid blocks for the memory device 130 that may be different from the number of blocks in the set of blocks on the device.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOR flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and the like. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 and convert responses associated with the memory devices 130 and/or the memory device 140 into information for the host system 120.

In some embodiments, the memory devices 130 include local media controllers 135 that operate in conjunction with memory sub-system controller 115 to execute operations on one or more memory cells of the memory devices 130.

The memory sub-system 110 also includes a partially good block (PGB) management component 113 that is responsible for identification and handling of PGBs in the memory devices 130 and 140. More specifically, based on a programming failure being detected at a block in the memory device 130, the PGB management component 113 determines whether the block is a PGB based on a number of failed bytes in the block. Based on determining the block is a PGB, the PGB management component 113 identifies a good (unfailing) portion of the block and stores a record (e.g., in a look-up table in an file storage area associated with the memory device 130) indicating that the block is a PGB and identifying the unfailing portion of the block. When a command is received to execute a data operation on the block (e.g., a read or a write operation), the PGB management component 113 identifies a failed portion of the block based on the record and disables the failed portion of the block so that the data operation can be executed on the unfailing portion of the block without interference from the failed portion. In an example of the foregoing, a block in the memory device 130 is horizontally divided into two halves—a left half and a right half—by a central row decoder. Upon detecting a programming failure at the block, the PGB management component 113 determines the block is a PGB based on the number of failed bytes in the block. The PGB management component 113 identifies the left half of the block as the good half and stores a record indicating the block is a PGB and identifying the left half of the block as the good half. When a command to execute a data operation on the block is received, the PGB component 113 disables the right half of the block by turning off switch transistors of the row decoder on the right half, and the data operation is executed on the left half of the block (the good half).

In some embodiments, the memory sub-system controller 115 includes at least a portion of the data PGB management component 113. For example, the memory sub-system controller 115 can include a processor 117 (processing device) configured to execute instructions stored in local memory 119 for performing the operations described herein. In some embodiments, the data PGB management component 113 is part of the host system 120, an application, or an operating system. In some embodiments, the local media controller 135 includes at least a portion of the data PGB management component 113.

Figure 2A:
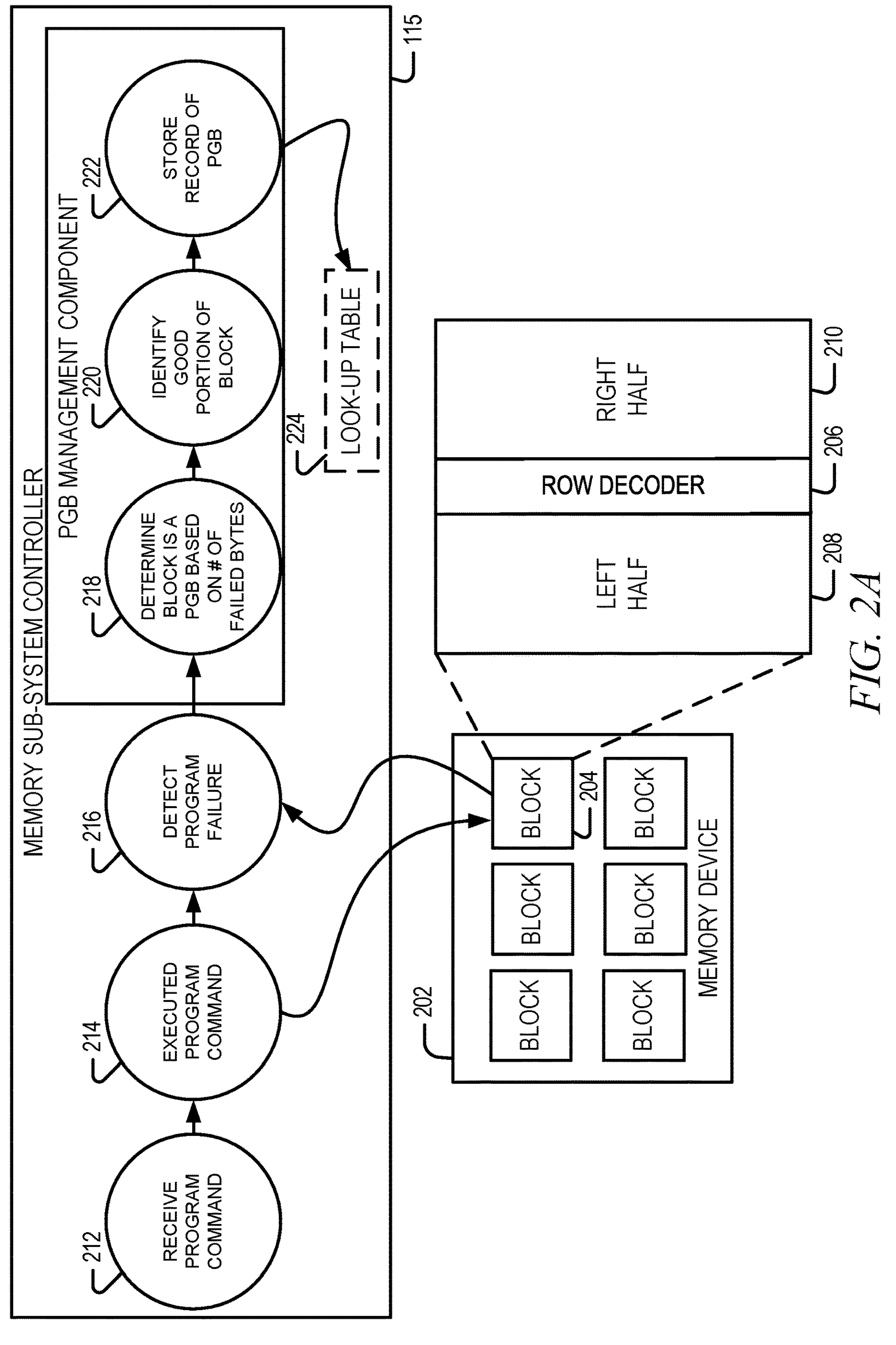
FIG. 2A is a conceptual diagram illustrating an example interaction between components of a memory sub-system in identifying a partially good block, in accordance with some embodiments of the present disclosure.
Figure 2B:
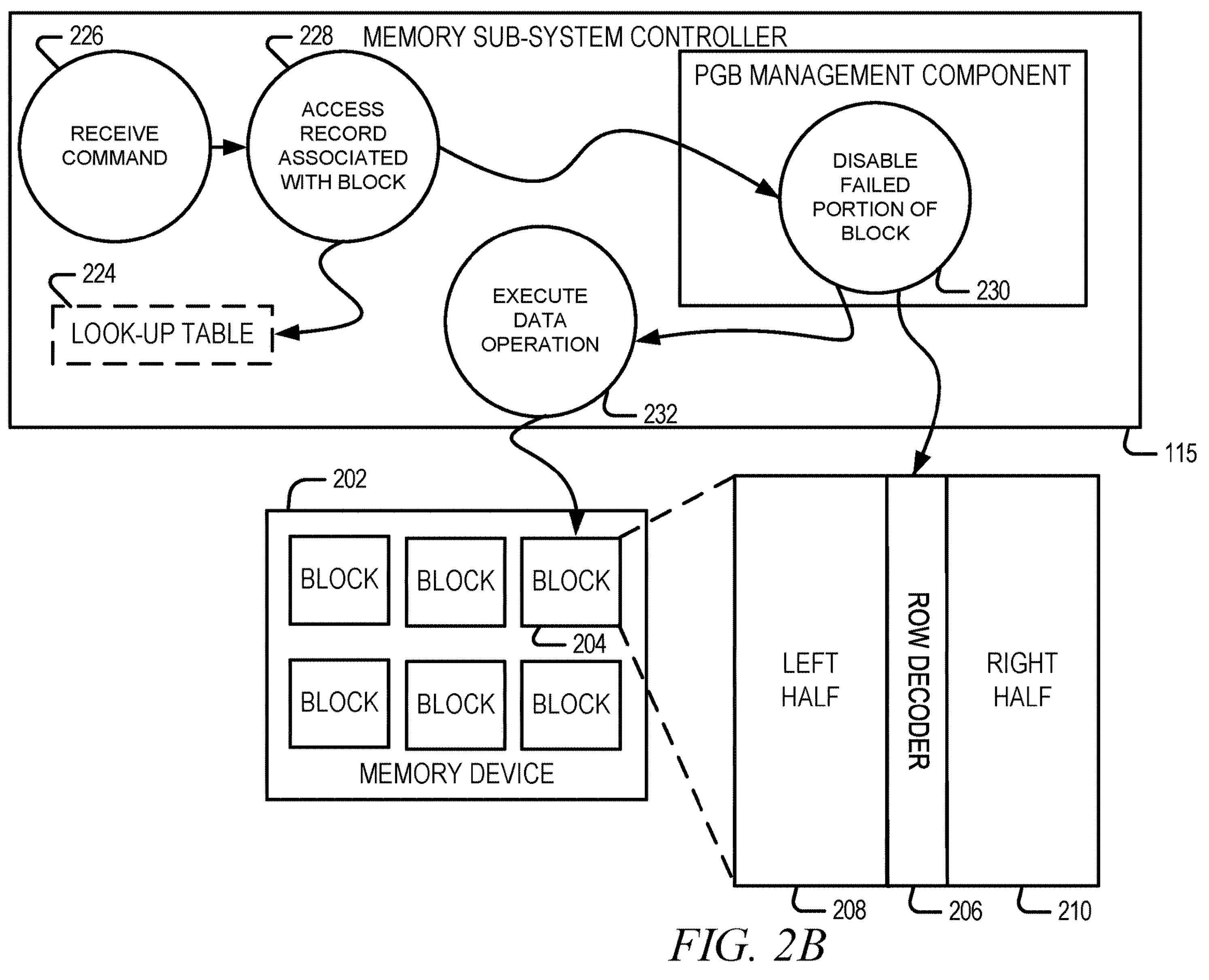
FIG. 2B is a conceptual diagram illustrating an example interaction between components of a memory sub-system in using a partially good block, in accordance with some embodiments of the present disclosure.

FIGS. 2A and 2B are conceptual diagrams illustrating example interactions between components of a memory sub-system in identifying and using a partially good block in a memory device 202, in accordance with some embodiments of the present disclosure. In the example illustrated in FIGS. 2A and 2B, the memory device 202 is an example memory device 130 in the example form of a NAND memory device. The memory device 202 includes multiple NAND dies. Specifically, in the example illustrated, the memory device includes n dies (dies 0 to n−1). Each die may include one or more planes and each plane includes multiple block such as block 204. Each block includes a 2D array that includes pages (rows) and strings (columns). A string includes a plurality of memory cells connected in series. Each memory cell is used to represent one or more bit values. A single NAND flash cell includes a transistor that stores an electric charge on a memory layer that is isolated by oxide insulating layers above and below.

One or more row decoders within a page within a block may physically isolate the page (and thus the block) into multiple portions. For example, as shown, a row decoder 206 placed at the center of pages within the block 204 divides the block 204 into a left half 208 and a right half 210. Signals from the row decoder 206 transmit from the center of a page to the edge of the page. Physically isolating portions of pages in this manner reduces word line loading, which helps reduce timing for word line ramping and stabilization while also improving timing for read and programming operations.

As shown, a command to program data to the memory device 202 is received (e.g., from the host system 120) by the memory sub-system controller 115, at operation 212. At operation 214, the memory sub-system controller 115 executes a programming operation to program the data to the block 204 of the memory device 202. The memory sub-system controller 115 detects a programming failure at the block 204, at operation 216.

Based on the programming failure at the block 204, the PGB management component 113 determines whether the block 204 is a PGB based on a number of failed bytes in the block 204, at operation 218. The PGB management component 113 may determine the number of failed bytes based on a scan of the block such as a count fail byte (CFByte). As an example, the PGB management component 113 may determine the block is a partially good block based on the number of failed bytes in the block satisfying a threshold condition (e.g., based on determining the number of failed bytes exceeds a threshold number of failed bytes defined by the threshold condition).

Based on determining the block is a partially good block, the PGB management component 113 identifies an unfailing (good) portion of the block 204, at operation 220. That is, the PGB management component 113 determines whether the left half 208 or the right half 210 is the good half (unfailing portion) of the block 204.

The PGB management component 113 determines which half of the block 204 is the unfailing portion based on a comparison of the number of failed bytes in the left half 208 with the number of failed bytes in the right half 210. More specifically, the PGB management component 113 determines a difference between the number of failed bytes in the left half 208 and the number of failed bytes in the right half 210 and identifies which half is the unfailing portion based on whether the difference exceeds a threshold difference. For example, the PGB management component 113 may determine the left half 208 of the block 204 is the unfailing portion based on the difference exceeding the threshold and may determine the right half 210 of the block 204 is the unfailing portion based on the difference not exceeding the threshold. In this example, the threshold number of failed bytes is larger than the threshold difference.

At operation 222, the PGB management component 113 stores a record indicating that the block 204 is a partially good block and identifying the unfailing portion of the block (e.g., either the left half 208 or the right half 210). For example, the PGB management component 113 may store the record as part of a look-up table 224 maintained in a file system area associated with the memory device 202.

With reference to FIG. 2B, at operation 226, the controller 115 receives a command to perform a data operation (e.g., a read operation or a programming operation) on the block 204 of the memory device 202. In response to receiving the command, the controller 115 accesses the stored record associated with the block 204, at operation 228. For example, the record may be accessed from the look-up table 224 stored in a file system area of the memory sub-system 110 that is associated with the memory device 202.

Based on the record indicating that the block 204 is a PGB, the PGB management component 113 disables a failed portion of the block (e.g., either the left half 208 or the right half 210), at operation 230. The processing device may disable the failing half of the block 204 (e.g., the either the left half 208 or the right half 210) by turning off switch transistors of the row decoder 206 on the side of the failing half of the block 204.

At operation 232, the controller 115 executes a programming or read operation on the unfailing half of the block 204 (e.g., either the left half 208 or the right half 210) without interference from the (disabled) failing half of the block 204.

It shall be appreciated that while the example described above and other examples mentioned below address a block that is horizontally divided into two portion (two halves), the techniques for identifying and using PGBs described herein are not limited to blocks that are divided into any particular number of portions. That is, the techniques for identifying and using PGBs described herein may be employed on blocks that are divided into more than two portions. For example, the techniques for identifying and using PGBs described herein may be employed on a block that includes three row decoders that physically isolate the block into four quarters.

Figure 3:
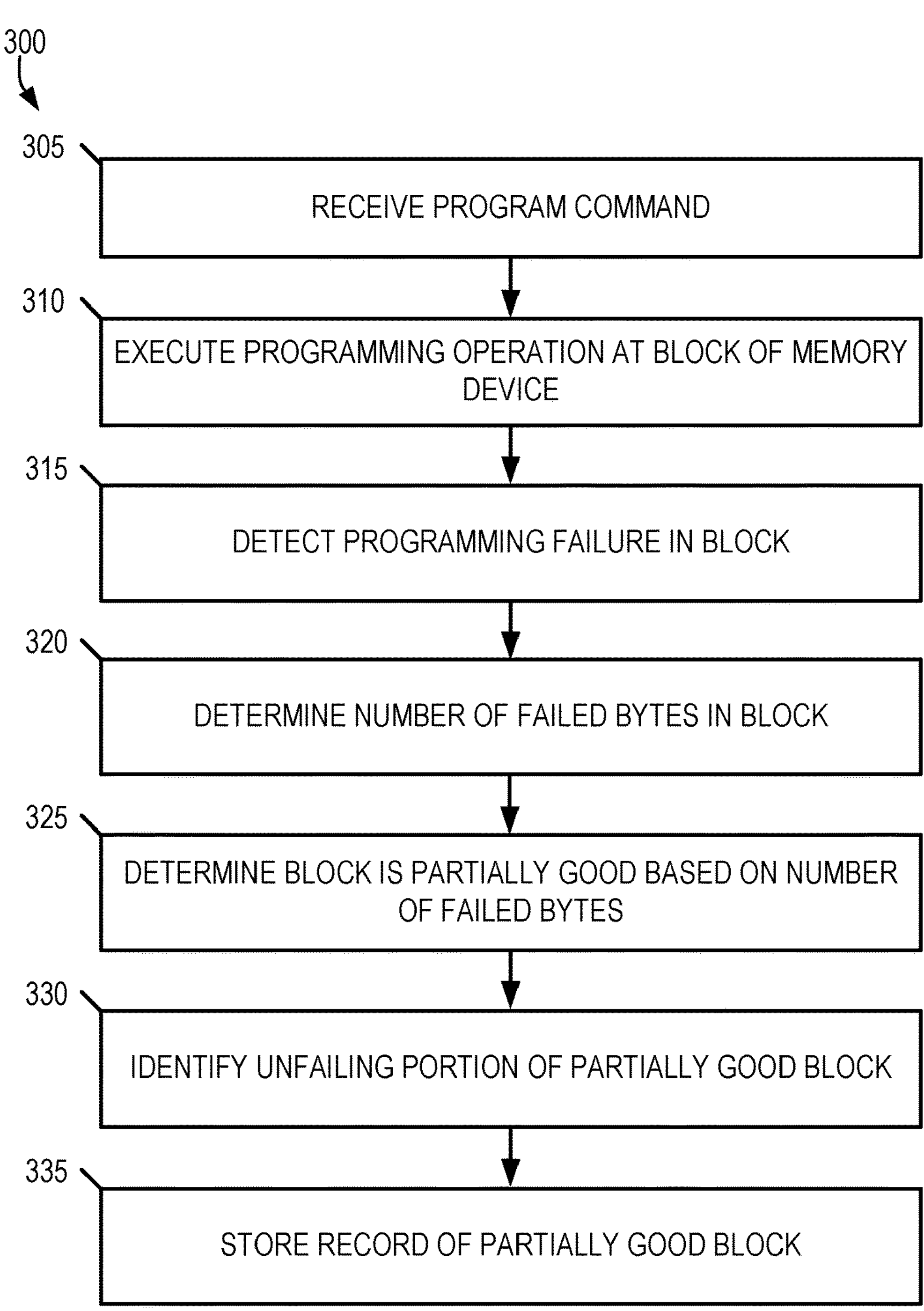
FIGS. 3 and 4 are flow diagrams illustrating an example method for performing identification of a partially good block in a memory device, in accordance with some embodiments of the present disclosure.

FIG. 3 is a flow diagram illustrating an example method 300 for performing identification of a PGB in a memory device, in accordance with some embodiments of the present disclosure. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the PGB management component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 300 begins at operation 305, where the processing device receives a command (e.g., from the host system 120) to program data to a memory device (e.g., the memory device 130). The processing device, at operation 310, executes a programming operation to program the data to a block of the memory device.

At operation 315, the processing device detects a programming failure at the block. That is, the processing device detects a failure of the programming operation performed at operation 310. In response to detecting the programming failure, the processing device determines a number of failed bytes in the block, at operation 320. The processing device may determine the number of failed bytes based on a scan of the block. In a more specific example, the processing device may determine the number of failed bytes by performing a count fail byte (CFByte) scan on the block.

The processing device determines the block is partially good based on the number of failed bytes, operation 325. As an example, the processing device may determine the block is a PGB based on the number of failed bytes in the block satisfying a threshold condition (e.g., based on determining the number of failed bytes does not exceed a threshold number of failed bytes defined by the threshold condition).

Based on determining the block is a partially good block, the processing device identifies an unfailing (good) portion of the block, at operation 330. The processing device may identify the unfailing portion of the block based on a comparison of the number of failed bytes in each portion of the block. In an example, the block is horizontally divided into two halves by a central row decoder and the processing device identifies either the left half or the right half as being the unfailing portion of the block based on a comparison of a first number of failed bytes in the left half of the block and a second number of failed bytes in the right half of the block.

At operation 335, the processing device stores a record indicating that the block is a PGB and identifying the unfailing portion of the block. For example, the processing device may store the record as part of a look-up table maintained in a file system area associated with the memory device.

Figure 4:
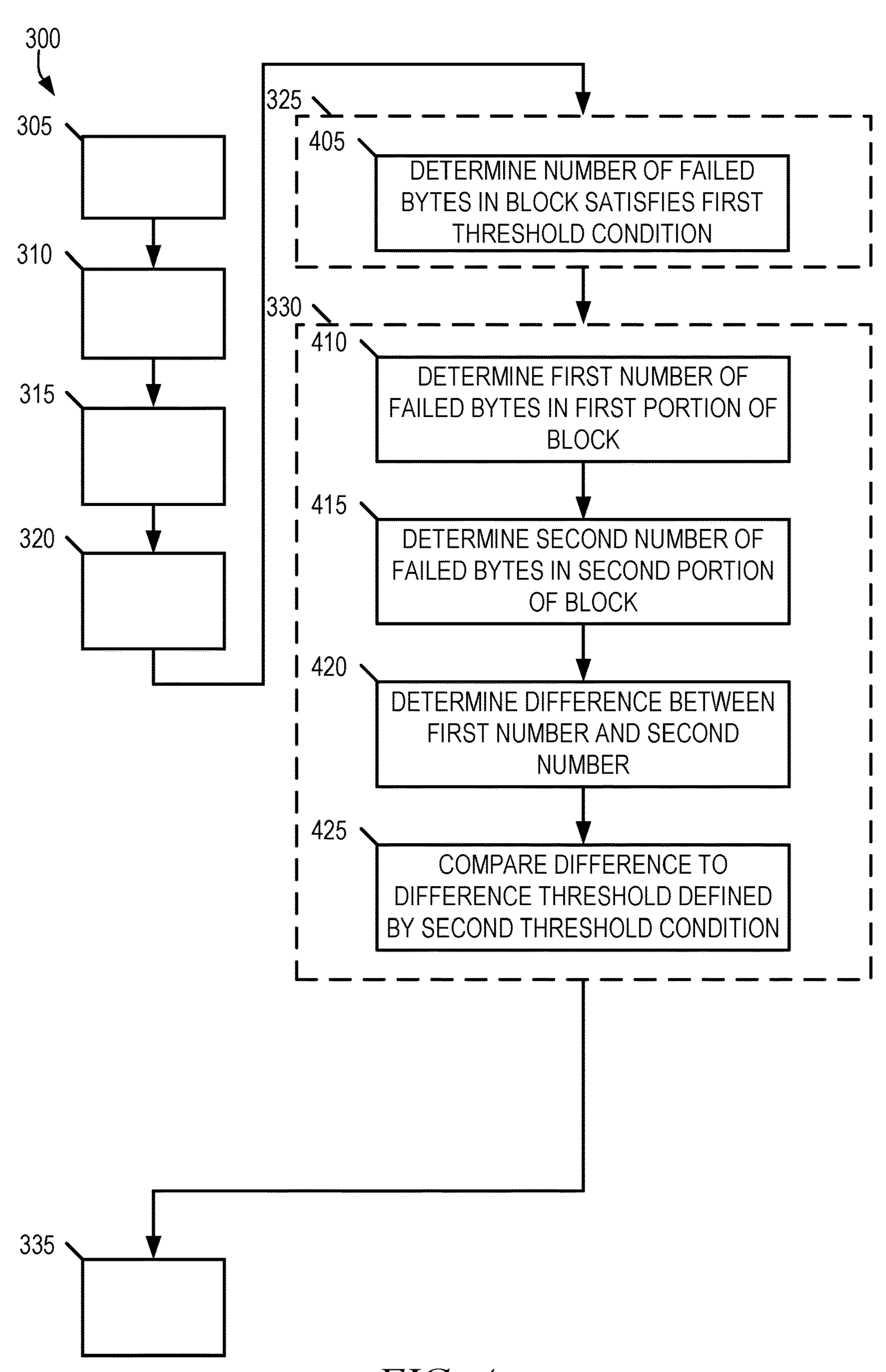

As shown in FIG. 4, the method 300 may, in some embodiments, include operations 405, 410, 415, 420, and 425. Consistent with these embodiments, the operation 405 may be performed as part of the operation 325 where the processing device determines the block is partially good based on the number of failed bytes. At operation 405, the processing device determines that the number of failed bytes in the block satisfies a first threshold condition. As an example, the first threshold condition may define a threshold number of failed bytes for the block, and determining that the first threshold condition is satisfied includes determining the number of failed bytes in the block does not exceed the threshold number of failed bytes.

Consistent with these embodiments, the operations 410, 415, 420, and 425 may be performed as part of the operation 330 where the processing device identifies an unfailing portion of the block. The processing device determines, at operation 410, a first number of failed bytes in a first portion of the block (e.g., a first half of the block) and the processing device determines, at operation 415, a second number of failed bytes in a second portion of the block (e.g., a second half of the block). The processing device may determine the first and second number of failed bytes by performing an individual scan (e.g., a failed bytes scan) of each portion of the block.

The processing device compares the first number of failed bytes to the second number of failed bytes to determine which portion of the block is the unfailing portion. For example, as shown, at operation 420, the processing device determines a difference between the first number of failed bytes and the second number of failed bytes, and at operation 425, the processing device identifies the unfailing portion based on a comparison of the difference with a difference threshold defined by a second threshold condition. As an example, the second threshold condition may define a threshold difference and the processing device identifies which portion of the block is the unfailing portion based on whether the difference exceeds the threshold difference. That is, the processing device may determine the first portion (e.g., the left half) of the block is the unfailing portion based on the difference exceeding the threshold, and when the difference does not exceed the threshold, the processing device may identify the second portion (e.g., the right half) as the unfailing portion. Consistent with some embodiments, the threshold number of failed bytes defined by the first threshold condition is larger than the threshold difference defined by the second threshold condition.

Figure 5:
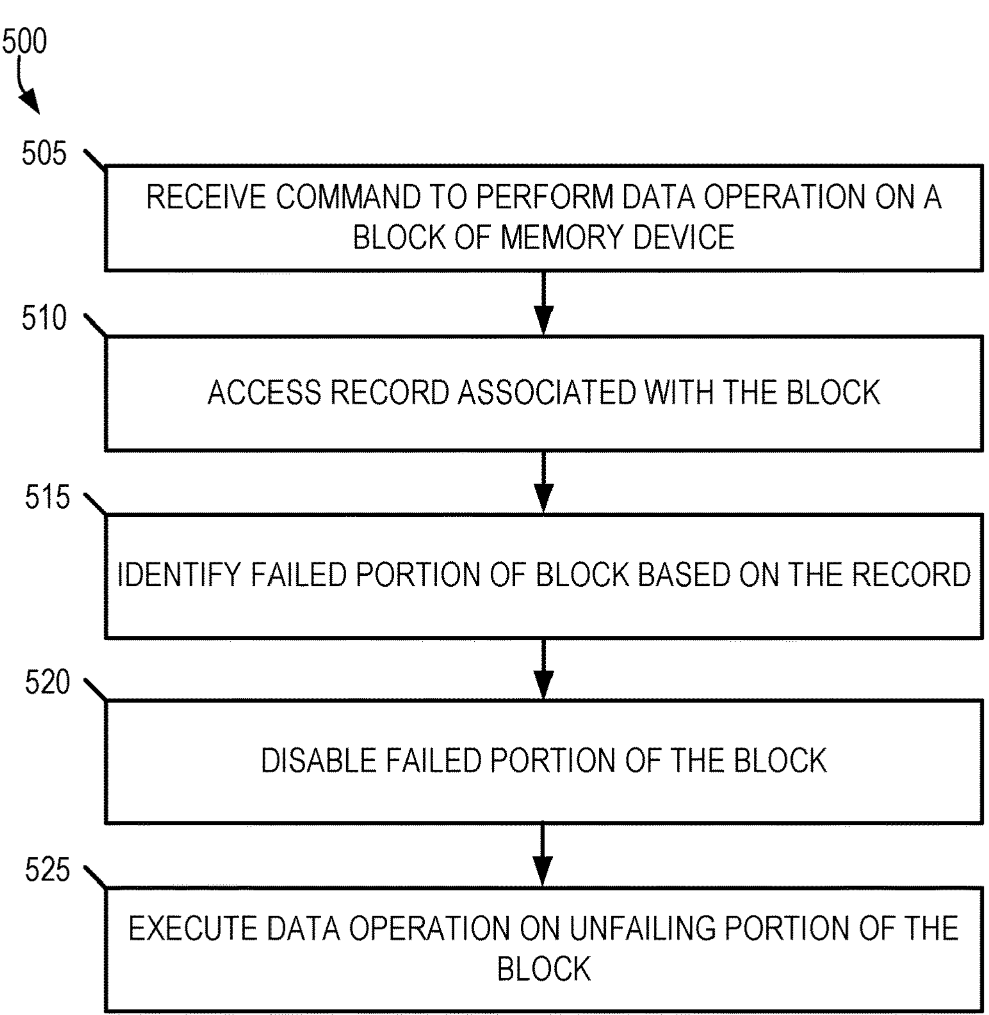
FIG. 5 is a flow diagram illustrating an example method for using a partially good block in a memory device, in accordance with some embodiments of the present disclosure.

FIG. 5 is a flow diagram illustrating an example method 500 for using a PGB in a memory device, in accordance with some embodiments of the present disclosure. The method 500 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 500 is performed by the PGB management component 113 of FIG. 1. Although processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing device receives a command to perform a data operation on a block of a memory device (e.g., memory device 130). In response to receiving the command, the processing device accesses a record associated with the block, at operation 510. The record indicates that the block is a PGB and identifies an unfailing portion of the block. The record may, for example, be accessed from a look-up table stored in a file system area associated with the block. The processing device, at operation 515, identifies a failed portion of the block based on the unfailing portion indicated by the record. In an example, the record indicates that a first half (e.g., a left half) of the block is an unfailing portion, and based on the record indicating the first half is the unfailing portion, the processing device identifies the second half (e.g., the right half) of the block as the failed portion.

Based on the block being a partially good block, the processing device disables a failed portion of the block, at operation 520, thereby allowing the processing device to execute the data operation on the unfailing portion of the block, which is performed at operation 525. As an example, the block may comprise two halves that are physically isolated by a row decoder. That is, the block may include a first half (e.g., a left half) and a second half (e.g., a right half) that are separated by a row decoder. The processing device may disable a failing half of the block by turning off the row decoder's switch transistors on the failing half to direct the data operation at the unfailing half.

Described implementations of the subject matter can include one or more features, alone or in combination as illustrated below by way of example.

Example 1. A memory sub-system comprising: a memory device; and a processing device, operatively coupled with the memory device, configured to perform operations comprising: detecting a programming failure at a block of the memory device; based on detecting the programming failure, determining the block is partially good based on a number of failed bytes in the block; identifying an unfailing portion of the block in response to determining the block is partially good; and storing a record indicating the block is partially good and identifying the unfailing portion of the block.

Example 2. The memory sub-system of Example 1, wherein the operations further comprise: receiving a command to perform a data operation on the block; accessing the record in response to the command; based on the command indicating the block is partially good, disabling a failed portion of the block; and executing the data operation on the unfailing portion of the block while the failed portion of the block is disabled.

Example 3. The memory sub-system of any one of Examples 1 or 2, wherein the operations further comprise identifying the failed portion of the block based on the record.

Example 4. The memory sub-system of any one of Examples 1-3, wherein: the block comprises a row decoder that horizontally divides the failed portion and the unfailing portion in the block; and the disabling of the failed portion of the block comprises disabling one or more switch transistors of the row decoder corresponding to the failed portion of the block.

Example 5. The memory sub-system of any one of Examples 1-4, wherein determining the block is a partially good block comprises determining the number of failed bytes satisfies a threshold condition.

Example 6. The memory sub-system of any one of Examples 1-5, wherein: the threshold condition defines a threshold number of failed bytes; and determining the number of failed bytes satisfies the threshold condition comprises determining the number of failed bytes does not exceed the threshold number of failed bytes.

Example 7. The memory sub-system of any one of Examples 1-6, wherein identifying the unfailing portion of the block comprises: determining a first number of failed bytes in a first portion of the block; determining a second number of failed bytes in a second portion of the block; and comparing the first number of failed bytes to the second number of failed bytes.

Example 8. The memory sub-system of any one of Examples 1-7, wherein comparing the first number of failed bytes to the second number of failed bytes comprises: determining a difference between the first number of failed bytes to the second number of failed bytes; and determining whether the difference satisfies a threshold condition.

Example 9. The memory sub-system of any one of Examples 1-8, wherein the block comprises a central row decoder, the central row decoder horizontally dividing the block into a left half and a right half, the unfailing portion of the block corresponding to the left half or the right half of the block.

Example 10. The memory sub-system of any one of Examples 1-9, wherein the operations further comprise performing a count of failed bytes scan on the block to determine the number of failed bytes.

Example 11. A method comprising: executing, by a processing device, a program command on a block of a memory device, the block of the memory device being divided into a first portion and a second portion; detecting, by the processing device, a programming failure at the block of the memory device based on executing the program command; based on detecting the programming failure, determining, by the processing device, the block is partially good based on a number of failed bytes in the block; identifying, by the processing device, the first portion or the second portion as an unfailing portion of the block in response to determining the block is partially good; and storing, by the processing device, a record indicating the block is partially good and identifying the unfailing portion of the block.

Example 12. The method of Example 11, further comprising: receiving a command to perform a data operation on the block; accessing the record in response to the command; based on the command indicating the block is partially good, disabling a failed portion of the block; and executing the data operation on the unfailing portion of the block while the failed portion of the block is disabled.

Example 13. The method of any one of Examples 11 or 12, wherein the operations further comprise identifying the failed portion of the block based on the record.

Example 14. The method of any one of Examples 11-13, wherein: the block comprises a row decoder that horizontally divides the failed portion and the unfailing portion in the block; and the disabling of the failed portion of the block comprises disabling one or more switch transistors of the row decoder corresponding to the failed portion of the block.

Example 15. The method of any one of Examples 11-14, wherein determining the block is a partially good block comprises determining the number of failed bytes satisfies a threshold condition.

Example 16. The method of any one of Examples 11-15, wherein: the threshold condition defines a threshold number of failed bytes; and determining the number of failed bytes satisfies the threshold condition comprises determining the number of failed bytes does not exceed the threshold number of failed bytes.

Example 17. The method of any one of Examples 11-16, wherein identifying the unfailing portion of the block comprises: determining a first number of failed bytes in a first portion of the block; determining a second number of failed bytes in a second portion of the block; and comparing the first number of failed bytes to the second number of failed bytes.

Example 18. The method of any one of Examples 11-17, wherein comparing the first number of failed bytes to the second number of failed bytes comprises: determining a difference between the first number of failed bytes to the second number of failed bytes; and determining whether the difference satisfies a threshold condition.

Example 19. The method of any one of Examples 11-18, wherein the block comprises a central row decoder, the central row decoder horizontally dividing the block into a left half and a right half, the unfailing portion of the block corresponding to the left half or the right half of the block.

Example 20. A non-transitory computer-readable storage medium comprising instructions that, when executed by a processing device, configure the processing device to perform operations comprising: detecting a programming failure at a block of a memory device, the block of the memory device being horizontally divided into a first half and a second half; based on detecting the programming failure, determining the block is partially good based on a number of failed bytes in the block; determining the first half of the block is an unfailing portion of the block in response to determining the block is partially good; and storing a record indicating the block is partially good and identifying the first half as the unfailing portion of the block.

Figure 6:
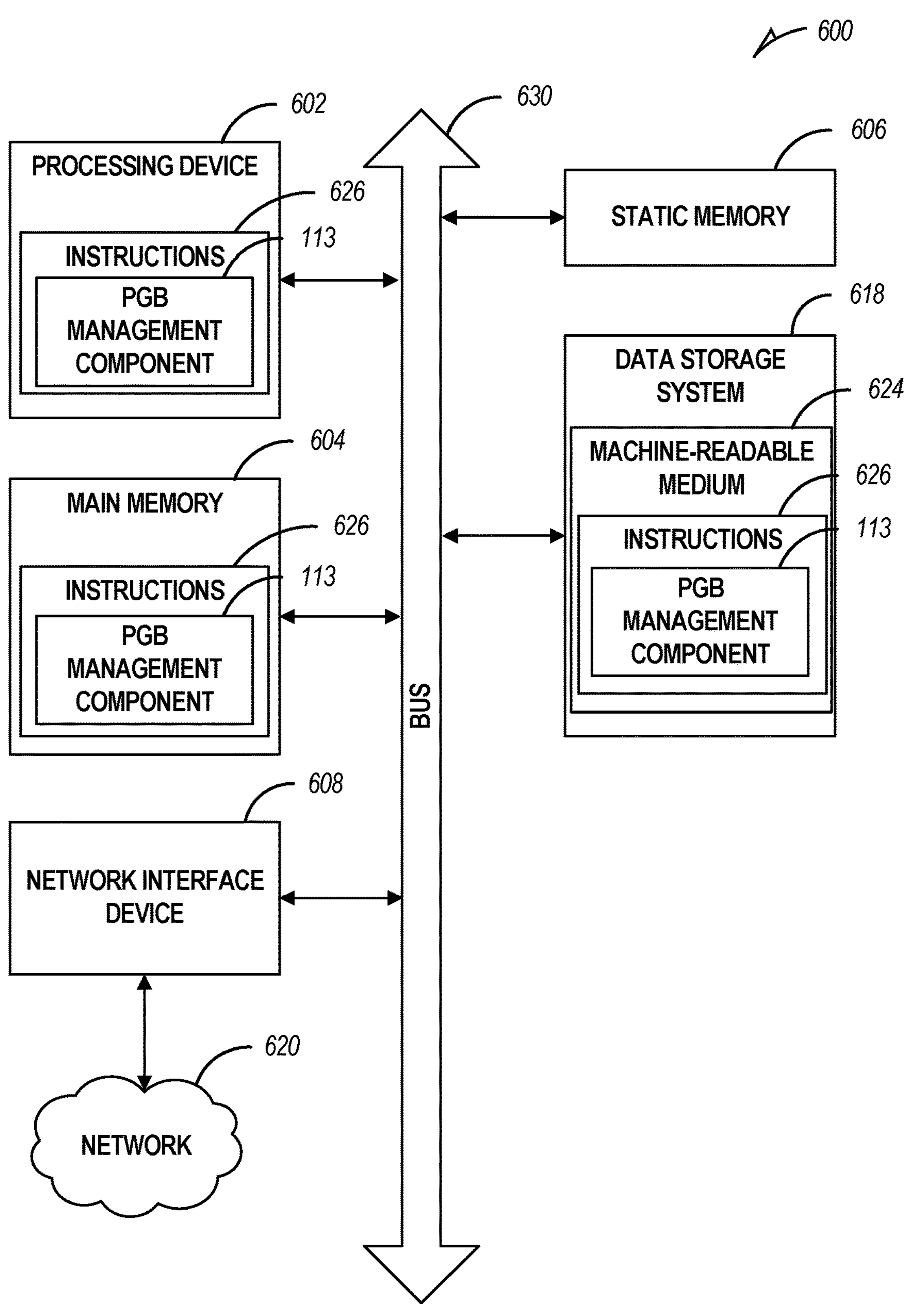
FIG. 6 is a block diagram of an example computer system in which embodiments of the present disclosure may operate.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data PGB management component 113 of FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term “machine” shall also be taken to include any collection of machines that individually or jointly execute a set (or multiple sets) of instructions to perform any one or more of the methodologies discussed herein.

The example computer system 600 includes a processing device 602, a main memory 604 (e.g., ROM, flash memory, DRAM such as SDRAM or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an ASIC, a FPGA, a digital signal processor (DSP), network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a data destruction component (e.g., the data PGB management component 113 of FIG. 1). While the machine-readable storage medium 624 is shown in an example embodiment to be a single medium, the term “machine-readable storage medium” should be taken to include a single medium or multiple media that store the one or more sets of instructions. The term “machine-readable storage medium” shall also be taken to include any medium that is capable of storing or encoding a set of instructions for execution by the machine and that cause the machine to perform any one or more of the methodologies of the present disclosure. The term “machine-readable storage medium” shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system’s registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader scope of embodiments of the disclosure as set forth in the following claims. The specification and drawings are, accordingly, to be regarded in an illustrative sense rather than a restrictive sense.

What is claimed is:

1. A memory sub-system comprising:

a memory device; and a processing device, operatively coupled with the memory device, configured to perform operations comprising:

detecting a programming failure at a block of the memory device, the block comprising a central row decoder that divides the block into a first half and a second half;

based on detecting the programming failure, determining the block is partially good based on a number of failed bytes in the block;

identifying an unfailing half of the block in response to determining the block is partially good;

storing a record indicating the block is partially good and identifying the unfailing half of the block;

receiving a command to perform a data operation on the block;

accessing the record in response to the command;

based on the command indicating the block is partially good, disabling a failed half of the block, the disabling of the failed half of the block comprising disabling one or more switch transistors of the central row decoder that correspond to the failed half of the block; and executing the data operation on the unfailing half of the block while the failed half of the block is disabled.

2. The memory sub-system of claim 1, wherein:

the disabling of the failed half comprises disabling the first half of the block by disabling the one or more switch transistors, the one or more switch transistors corresponding to the first half of the block.

3. The memory sub-system of claim 1, wherein the operations further comprise identifying the failed half of the block based on the record.

4. The memory sub-system of claim 1, wherein identifying the unfailing half of the block comprises:

performing a first scan of the first half of the block; and performing a second scan of the second half of the block.

5. The memory sub-system of claim 1, wherein determining the block is a partially good block comprises determining the number of failed bytes satisfies a threshold condition.

6. The memory sub-system of claim 5, wherein:

the threshold condition defines a threshold number of failed bytes; and determining the number of failed bytes satisfies the threshold condition comprises determining the number of failed bytes does not exceed the threshold number of failed bytes.

7. The memory sub-system of claim 1, wherein identifying the unfailing half of the block comprises:

determining a first number of failed bytes in a first half of the block;

determining a second number of failed bytes in a second half of the block; and comparing the first number of failed bytes to the second number of failed bytes.

8. The memory sub-system of claim 7, wherein comparing the first number of failed bytes to the second number of failed bytes comprises:

determining a difference between the first number of failed bytes to the second number of failed bytes; and determining whether the difference satisfies a threshold condition.

9. The memory sub-system of claim 1, wherein the central row decoder horizontally divides the block into a left half and a right half.

10. The memory sub-system of claim 1, wherein the operations further comprise performing a count of failed bytes scan on the block to determine the number of failed bytes.

11. A method comprising:

executing, by a processing device, a program command on a block of a memory device, the block of the memory device comprising a central row decoder that devices the block into a first half and a second half;

detecting, by the processing device, a programming failure at the block of the memory device based on executing the program command;

based on detecting the programming failure, determining, by the processing device, the block is partially good based on a number of failed bytes in the block;

identifying, by the processing device, the first half or the second half as an unfailing half of the block in response to determining the block is partially good;

storing, by the processing device, a record indicating the block is partially good and identifying the unfailing half of the block;

receiving a command to perform a data operation on the block;

accessing the record in response to the command;

based on the command indicating the block is partially good, disabling a failed half of the block, the disabling of the failed half of the block comprising disabling one or more switch transistors of the central row decoder that correspond to the failed half of the block; and executing the data operation on the unfailing half of the block while the failed half of the block is disabled.

12. The method of claim 11, wherein:

the disabling of the failed half comprises disabling the first half of the block by disabling the one or more switch transistors, the one or more switch transistors corresponding to the first half of the block.

13. The method of claim 11, wherein the operations further comprise identifying the failed half of the block based on the record.

14. The method of claim 11, wherein identifying the unfailing half of the block comprises:

performing a first scan of the first half of the block; and performing a second scan of the second half of the block.

15. The method of claim 11, wherein determining the block is a partially good block comprises determining the number of failed bytes satisfies a threshold condition.

16. The method of claim 15, wherein:

the threshold condition defines a threshold number of failed bytes; and determining the number of failed bytes satisfies the threshold condition comprises determining the number of failed bytes does not exceed the threshold number of failed bytes.

17. The method of claim 11, wherein identifying the unfailing half of the block comprises:

determining a first number of failed bytes in a first half of the block;

determining a second number of failed bytes in a second half of the block; and comparing the first number of failed bytes to the second number of failed bytes.

18. The method of claim 16, wherein comparing the first number of failed bytes to the second number of failed bytes comprises:

determining a difference between the first number of failed bytes to the second number of failed bytes; and determining whether the difference satisfies a threshold condition.

19. The method of claim 11, wherein the the central row decoder horizontally divides the block into a left half and a right half.

20. A non-transitory computer-readable storage medium comprising instructions that, when executed by a processing device, configure the processing device to perform operations comprising:

detecting a programming failure at a block of a memory device, the block of the memory device comprising a central row decoder that horizontally divides the block into a first half and a second half;

based on detecting the programming failure, determining the block is partially good based on a number of failed bytes in the block;

determining the first half of the block is an unfailing half of the block in response to determining the block is partially good;

storing a record indicating the block is partially good and identifying the first half as the unfailing half of the block;

receiving a command to perform a data operation on the block;

accessing the record in response to the command;

based on the command indicating the block is partially good, disabling a failed half of the block, the disabling of the failed half of the block comprising disabling one or more switch transistors of a row decoder that correspond to the failed half of the block; and executing the data operation on the unfailing half of the block while the failed half of the block is disabled.

* * * * *